United States Patent
Sharma

(10) Patent No.: US 10,306,020 B2
(45) Date of Patent: May 28, 2019

(54) SOFTWARE UPGRADE IN A VIRTUALIZED OFFLINE CHARGING SYSTEM

(71) Applicant: Alcatel-Lucent USA Inc., Murray Hill, NJ (US)

(72) Inventor: Ranjan Sharma, New Albany, OH (US)

(73) Assignee: Nokia of America Corporation, Murray Hill, NJ (US)

( * ) Notice: Subject to any disclaimer, the term of this patent is extended or adjusted under 35 U.S.C. 154(b) by 280 days.

(21) Appl. No.: 15/272,359

(22) Filed: Sep. 21, 2016

(65) Prior Publication Data
US 2018/0084084 A1    Mar. 22, 2018

(51) Int. Cl.
*G06F 15/177*    (2006.01)
*H04L 29/08*    (2006.01)
(Continued)

(52) U.S. Cl.
CPC .............. *H04L 67/34* (2013.01); *H04L 12/14* (2013.01); *H04L 12/1407* (2013.01);
(Continued)

(58) Field of Classification Search
CPC ......... H04L 67/34; H04L 67/06; H04L 12/14; H04L 12/1407; H04L 41/0813;
(Continued)

(56) References Cited

U.S. PATENT DOCUMENTS

| 2015/0081910 A1 | 3/2015 | Assuncao et al. |
| 2015/0227384 A1 | 8/2015 | Zamir et al. |
| 2017/0139727 A1* | 5/2017 | Combellas ................ G06F 8/65 |

FOREIGN PATENT DOCUMENTS

WO    2016074489 A1    5/2016

OTHER PUBLICATIONS

A. Gulbrandsen, A DNS RR for Specifying the Location of Services (DNS SRV), Request for Comment 2782, Feb. 2000.
(Continued)

*Primary Examiner* — Hitesh Patel
*Assistant Examiner* — Joseph R Maniwang
(74) *Attorney, Agent, or Firm* — Duft & Bornsen, PC

(57) ABSTRACT

Systems, methods, and software for implementing a software upgrade in a virtualized Offline Charging System (OFCS) that includes a pool of Virtualized Charging Collection Functions (vCCF). In one embodiment, a software upgrade is identified for the virtualized OFCS, and installed with an upgrade process. The upgrade process includes developing a skeletal vCCF, which is pre-provisioned in the network, and installing the software upgrade in the skeletal vCCF. The upgrade process includes communicating with a DNS server to modify the priority in a DNS resource record for the skeletal vCCF to equal at least one of the other vCCFs in the pool. The upgrade process also includes designating an antiquated vCCF in the pool as the (next) skeletal vCCF, draining the accounting sessions from the skeletal vCCF, and communicating with the DNS server to set a priority in the DNS resource record for the skeletal vCCF so that the skeletal vCCF is selected last among the vCCFs in the pool by the CTFs for accounting sessions.

19 Claims, 8 Drawing Sheets

(51) Int. Cl.
  *H04L 12/24* (2006.01)
  *H04L 12/14* (2006.01)
  *H04M 15/00* (2006.01)
  *H04L 29/12* (2006.01)

(52) U.S. Cl.
  CPC ........ *H04L 41/082* (2013.01); *H04L 61/1511* (2013.01); *H04L 61/2007* (2013.01); *H04L 61/2061* (2013.01); *H04L 67/06* (2013.01); *H04M 15/65* (2013.01); *H04M 15/66* (2013.01)

(58) Field of Classification Search
  CPC .. H04L 41/082; H04L 41/0823; H04M 15/65; H04M 15/66
  USPC ........................................................ 709/221
  See application file for complete search history.

(56) References Cited

OTHER PUBLICATIONS

Ericsson; Network Functions Virtualization and Software Management; www.ericsson.com/res/docs/whitepapers; Dec. 1, 2015.

\* cited by examiner

*FIG. 6*

DATABASE
512

600

| DOMAIN | PRIORITY | WEIGHT | TARGET |
|---|---|---|---|
| .CCF | XX1 | YY1 | vCCF1.CUSTOMER.COM |
| .CCF | XX2 | YY2 | vCCF2.CUSTOMER.COM |
| .CCF | XX3 | YY3 | vCCF3.CUSTOMER.COM |
| .CCF | XX4 | YY4 | vCCF4.CUSTOMER.COM |
| .CCF | XX5 | YY5 | vCCF5.CUSTOMER.COM |
| ... | ... | ... | ... |

SOFTWARE UPGRADE IN A VIRTUALIZED OFFLINE CHARGING SYSTEM

FIELD OF THE INVENTION

The invention is related to the field of communication systems and, in particular, to offline charging systems.

BACKGROUND

Service providers have traditionally implemented a physical network architecture to deploy network functions, such as Offline Charging Systems (OFCS), routers, switches, gateways, servers, etc. For example, network functions were traditionally deployed as physical devices, where software was tightly coupled with the proprietary hardware. These physical network functions have to be manually installed into the network, which creates operational challenges and prevents rapid deployment of new network functions. To address these issues, service providers are turning to a virtualized network architecture, which is referred to as Network Functions Virtualization (NFV). In NFV, a Virtualized Network Function (VNF) is the implementation of a network function using software that is decoupled from the underlying hardware. A VNF may include one or more virtual machines (VM) running software and processes on top of servers, switches, storage, a cloud computing infrastructure, etc., instead of having dedicated hardware appliances for each network function.

Software upgrades (SU) for VNFs typically take one of the following approaches. The first approach is an "in-place" software upgrade, where VMs belonging to the VNF are grouped such that each group is updated to a new release/version. This approach has the benefit that not all of the capacity of the VNF is taken out of the service at a time. On the negative side, this approach requires operator intervention and supervision through the process. The second approach is to divert the incoming traffic away to another system, drain the system to be upgraded, perform an in-place software upgrade, and then bring back the system into operation. This approach has the benefit of being quicker, because the VMs can be grouped together in larger groups, or even addressed all at once in parallel. It has the drawback that the system being upgraded is not capable of handling any traffic during the upgrade. The third approach is to set up a new system with the new software in parallel, and commission the new system into the network as the old system is drained and de-commissioned. The drawback with this approach is that it requires additional standby resources and disruptive provisioning before the new system starts handling traffic.

Network operators continue to look for effective ways of implementing a software upgrade into VNFs that implement functions such as offline charging.

SUMMARY

Embodiments described herein provide systems and methods for installing a software upgrade in a virtualized offline charging system. A virtualized offline charging system is comprised of a plurality of virtual Charging Collection Functions (vCCF). When the vCCFs are antiquated (i.e., have an older version/release of software), the vCCFs are updated in an iterative fashion using a skeletal vCCF. The skeletal vCCF is initially provisioned in the network with a low priority/weight field in a Domain Name System (DNS) server so that Charging Trigger Functions (CTFs) will not select the skeletal vCCF. The software upgrade is installed on the skeletal vCCF, and the priority/weight field in the DNS server is modified so that the skeletal vCCF will be considered by CTFs for handling accounting sessions. One of the antiquated vCCFs can then be designated as the next skeletal vCCF, and the process repeats until all vCCFs are upgraded. This installation process is advantageous in that there is no service interruption while the software upgrade is being installed. Software upgrades typically require that a system, or a portion of a system, is taken out of service for a time period and do not provide system functionality to the deployed topology. Therefore, the capacity of the system is reduced while the new version of the software is being installed. In the systems and methods described herein, system capacity remains substantially constant so there is no service interruption.

One embodiment comprises a method of performing a software upgrade. The method includes setting up a network with a virtualized OFCS that includes a pool of vCCFs. The pool of vCCFs includes a skeletal vCCF that is pre-provisioned to communicate with Charging Trigger Functions (CTFs). The skeletal vCCF is also pre-provisioned in a Domain Name System (DNS) server with a DNS resource record having a priority set so that the skeletal vCCF is selected last among the vCCFs in the pool by the CTFs for accounting sessions. The method further includes identifying a software upgrade for the virtualized OFCS, and initiating an upgrade process to install the software upgrade. The upgrade process includes the iterative steps of developing the skeletal vCCF, installing the software upgrade in the skeletal vCCF, and communicating with the DNS server to modify the priority in the DNS resource record for the skeletal vCCF to equal at least one of the other vCCFs in the pool. The method further includes designating an antiquated vCCF in the pool as the (next) skeletal vCCF, draining the accounting sessions from the (next) skeletal vCCF, and communicating with the DNS server to set a priority in the DNS resource record for the (next) skeletal vCCF so that the (next) skeletal vCCF is selected last among the vCCFs in the pool by the CTFs for accounting sessions.

In another embodiment, the skeletal vCCF initially includes pilot Virtual Machines (VMs), and Input/Output (I/O) VMs that are configured to exchange Diameter messages with the CTFs. The VMs initially provisioned into the skeletal vCCF are unable to process Diameter Accounting Requests (ACR).

In another embodiment, the step of developing the skeletal vCCF includes adding Charging Function (CF) VMs to the skeletal vCCF that are enabled for processing Diameter ACR.

In another embodiment, the step of developing the skeletal vCCF includes identifying the antiquated vCCF in the pool, draining the accounting sessions from the antiquated vCCF, and repurposing Charging Function (CF) VMs from the antiquated vCCF to the skeletal vCCF.

In another embodiment, the step of communicating with the DNS server to set the priority in the DNS resource record for the skeletal vCCF so that the skeletal vCCF is selected last among the vCCFs in the pool comprises setting the priority in the DNS resource record for the skeletal vCCF to be the highest-numbered priority compared to other vCCFs in the pool.

In another embodiment, the upgrade process further includes communicating with the DNS server to set a weight field in the DNS resource record for the skeletal vCCF to a value of "1" so that the skeletal vCCF is selected last among the vCCFs in the pool by the CTFs.

In another embodiment, the upgrade process further includes communicating with the DNS server to increase the weight field in the DNS resource record for the skeletal vCCF, after installing the software upgrade in the skeletal vCCF.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 6 illustrates a database of a DNS server in an exemplary embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

The embodiments below provide for software upgrades within an Offline Charging System (OFCS). Offline charging is a process where charging information for resource usage is collected concurrently with resource usage. Offline charging can be of two types: session-based or event-based. In event-based charging, a Charging Trigger Function (CTF) reports the usage or service rendered where the service offering is rendered in a single operation. For example, the CTF may report the usage in an Accounting Request (ACR) EVENT. Session-based charging is the process of reporting usage for a service, and uses START, INTERIM, and STOP accounting data. During a service, a CTF may transmit multiple ACR Interims depending on the proceeding of the session.

Figure 1:
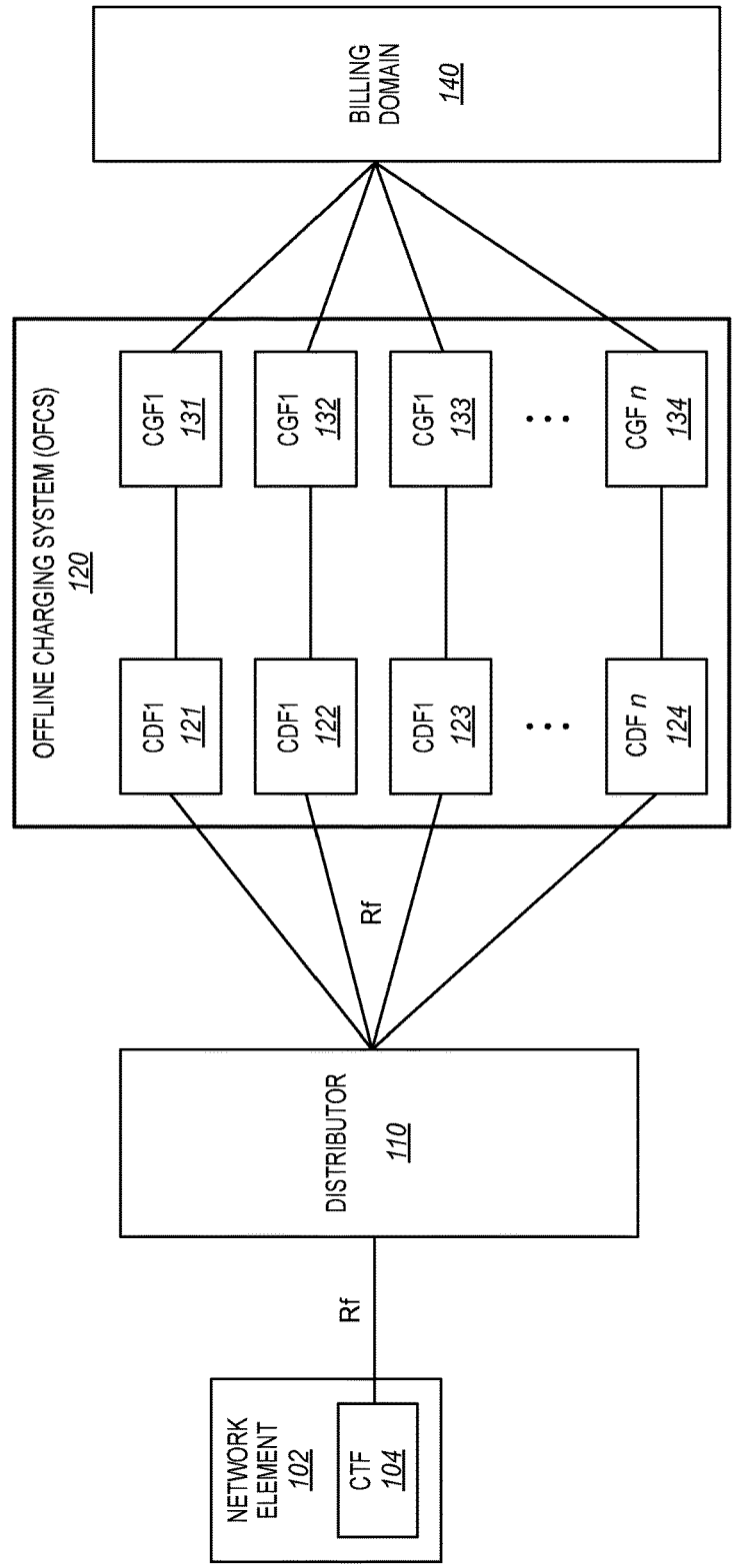
FIG. 1 illustrates an offline charging architecture in the prior art.

FIG. 1 illustrates an offline charging architecture 100 in the prior art. Architecture 100 includes a network element 102 that connects to an OFCS 120 through a distributor 110. Network element 102 includes a CTF 104 that detects chargeable events for services provided by network element 102, assembles information for the chargeable events into matching charging events, and sends the charging events to a Charging Data Function (CDF). In the case of network element 102, CTF 104 may use a Diameter Rf interface. Therefore, CTF 104 assembles the charging information into accounting requests, such as a Diameter Rf Accounting Request (ACR). Although one CTF 104 is illustrated in FIG. 1, there may be CTFs of many network elements in contact with distributor 110.

OFCS 120 is an apparatus, a server, a device, or equipment configured to implement offline charging for sessions or services provided by a network. OFCS 120 includes multiple instances of a CDF (CDF1-CDFn) 121-124 and a CGF (CGF1-CGFn) 131-134. A CDF comprises an element or module within OFCS 120 that receives charging events from CTFs within network elements, formats the charging events into CDRs, and sends the CDRs to a CGF. A CGF comprises an element or module within OFCS 120 that correlates CDRs for a session, and forwards a CDR file with the correlated CDRs to a billing domain 140. Although the terms CDF and CGF are used to describe OFCS 120, the functionality performed by CDFs and CGFs may be collectively referred to as Charging Collection Functions (CCFs). Billing domain 140 is the part of the operator network that receives and processes CDR files for billing mediation and other billing applications (e.g., statistical applications).

Distributor 110 is implemented between CTFs (e.g., CTF 104) and the CDFs 121-124 in OFCS 120. The purpose of distributor 110 is to distribute accounting requests (e.g., Diameter ACRs) from CTFs among the multiple CDFs 121-124 within OFCS 120. Distributor 110 may select CDFs for handling accounting requests based on a distribution algorithm, such as a "consistent hashing" algorithm.

Figure 2:
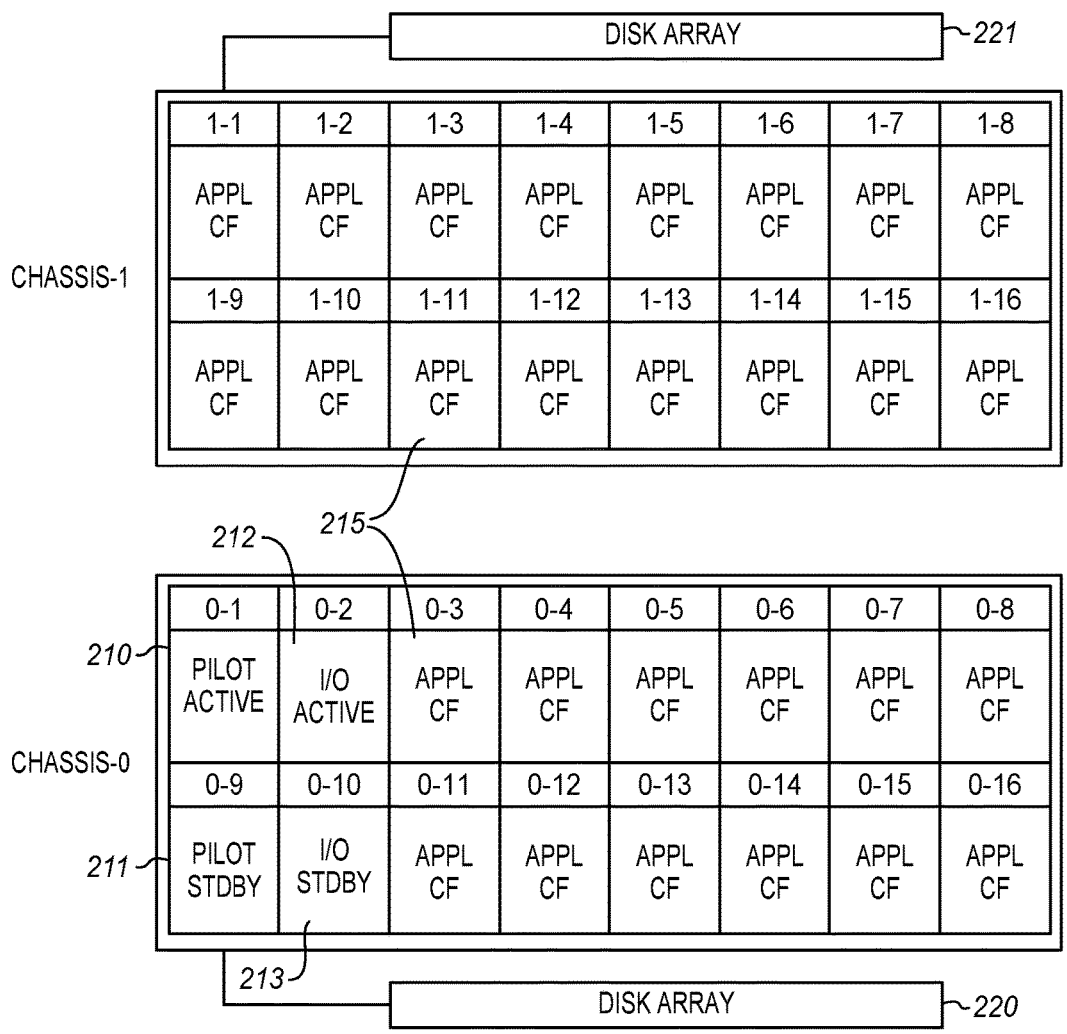
FIG. 2 illustrates a blade server used to implement an OFCS in the prior art.

One way of implementing an OFCS is with a blade server. FIG. 2 illustrates a blade server 200 used to implement an OFCS in the prior art. Blade server 200 includes two chassis each including sixteen blades. Chassis-0 includes a pair of pilot blades 210-211 that perform administrative functions. Pilot blades 210-211 work in an active/standby mode. The active pilot blade 210 attaches to a virtual IP address, and is monitored via heartbeat messaging by the standby pilot blade 211. In case of failure of the active pilot blade 210, the standby pilot blade 211 assumes the virtual IP address.

Blade server 200 also includes one or more pairs of Input/Output (I/O) blades 212-213 that act as the ingress point to the system. For instance, I/O blades 212-213 may communicate with a distributor over a Diameter Rf reference point to exchange accounting messages. I/O blades 212-213 may also work in an active/standby mode.

Blade server 200 also includes multiple Charging Function (CF) blades 215 that each executes application logic to provide offline charging functionality for processing Diameter ACRs. Each of the CF blades may provide CDF and CGF functionality, or CCF functionality. Blade server 200 also includes disk arrays 220-221 that are used by the blades to store generated CDRs.

Figure 3:
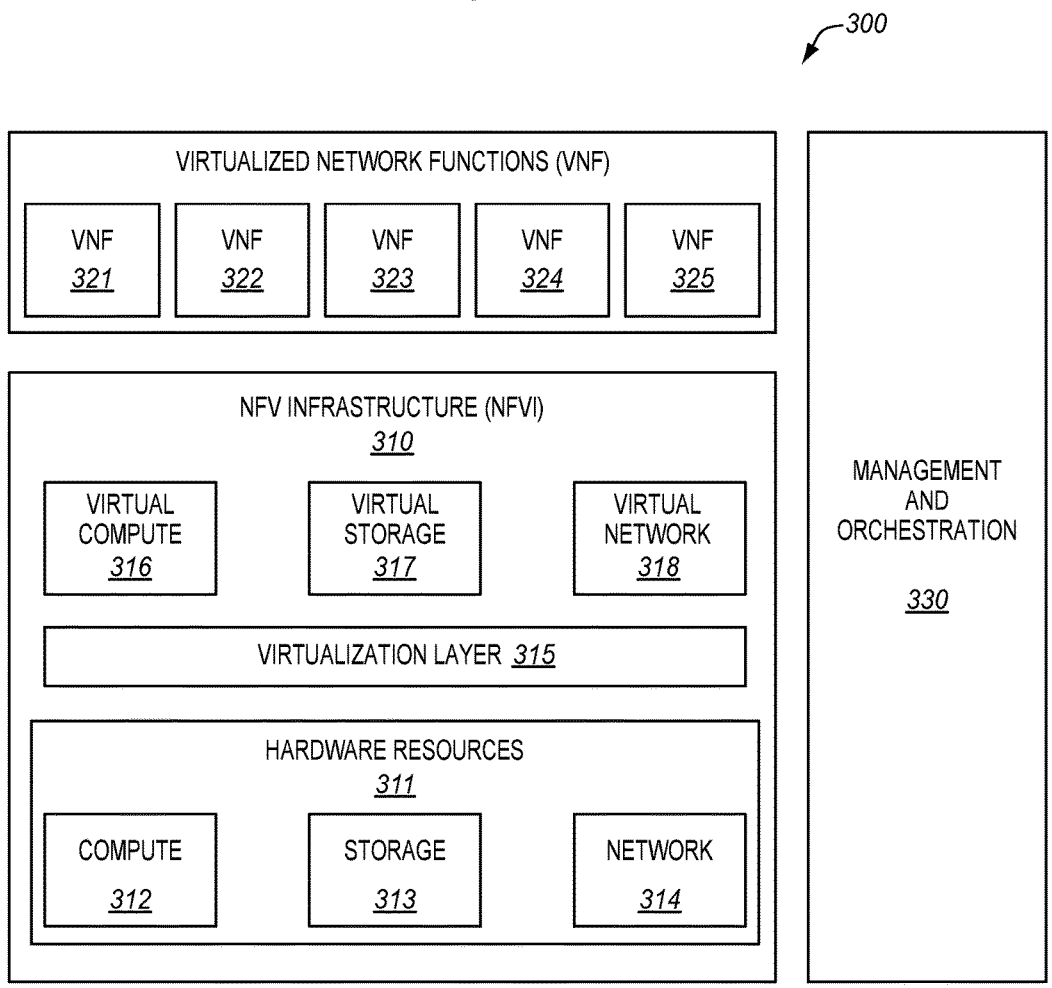
FIG. 3 illustrates a network architecture in the prior art.

Another way of implementing an OFCS is with a virtualized architecture. FIG. 3 illustrates a network architecture 300 in the prior art. Network architecture 300 uses NFV, which is a concept that virtualizes classes of network node functions into building blocks that may connect or chain together to create communication services. Architecture 300 includes an NFV infrastructure 310, which includes hardware resources 311, such as compute resources 312, storage resources 313, and network resources 314. NFV infrastructure 310 also includes a virtualization layer 315, which is able to create virtual compute resources 316, virtual storage resources 317, and virtual network resources 318.

Architecture 300 also includes Virtualized Network Functions (VNFs) 321-325. Each VNF 321-325 may comprise one or more virtual machines (VM) running different software and processes on top of NFV infrastructure 310. A VM is an operating system or application environment that is installed on software which imitates dedicated hardware. Specialized software called a hypervisor emulates a CPU, memory, hard disk, network, and/or other hardware resources, which allows the virtual machines to share the hardware resources. Each VNF 321-325 described herein performs one or more network functions. A network function is a "well-defined functional behavior" within a network, such as firewalling, Domain Name System (DNS), caching, network address translation (NAT), etc. Individual VNFs may be linked or chained (i.e., service chaining) together in a way similar to building blocks to offer a full-scale networking communication service.

Architecture 300 also includes management and orchestration layer 330. Management and orchestration layer 330 provides for planned automation and provisioning tasks within the virtualized environment. The tasks of orchestration include configuration management of compute resources 312, storage resources 313, and network resources 314. The tasks of orchestration also include provisioning of VMs and application instances, such as for VNFs 321-325. The tasks of orchestration may also include security and compliance assessment, monitoring, and reporting.

Figure 4:
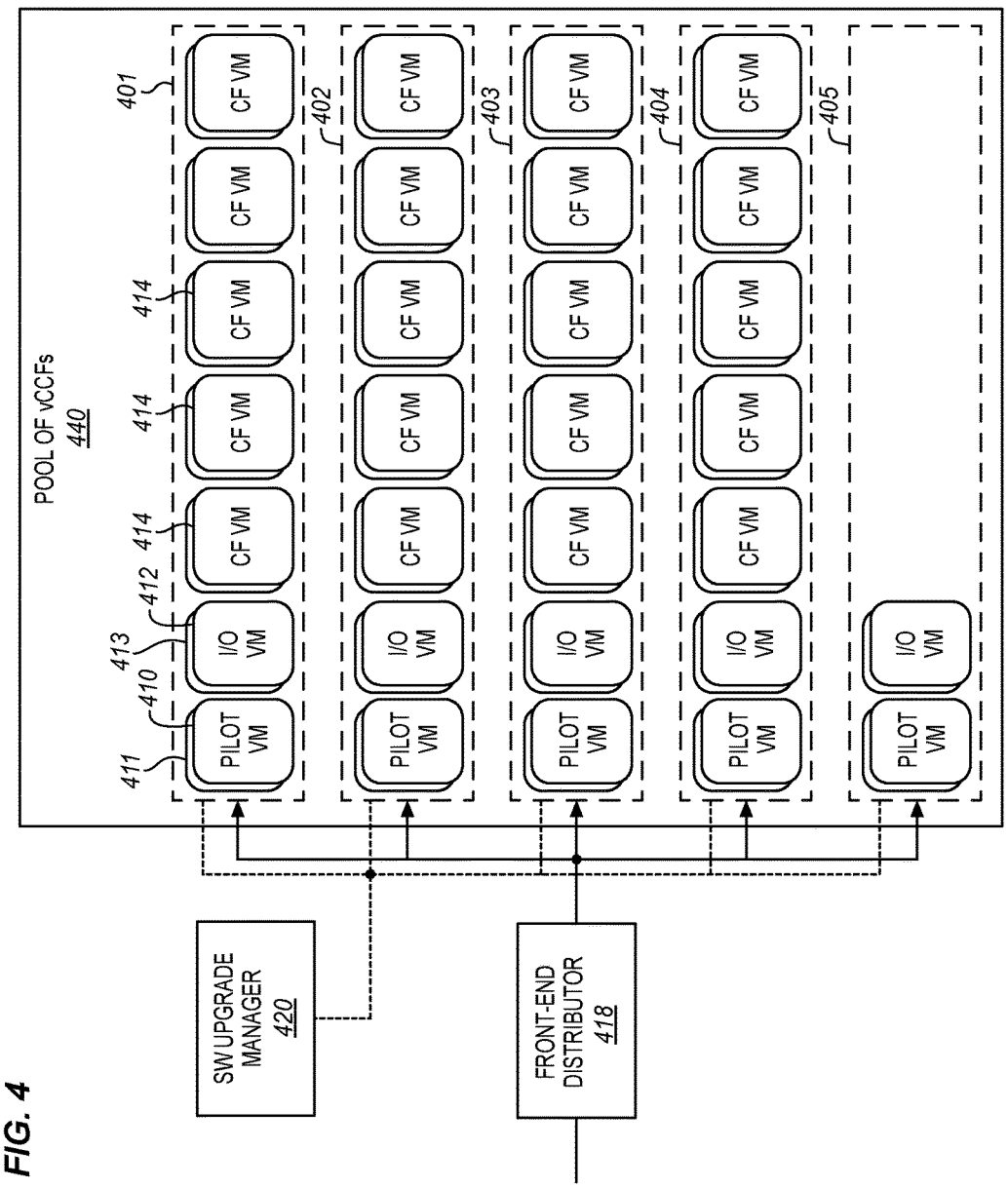
FIG. 4 illustrates a virtualized offline charging architecture in an exemplary embodiment.

In the embodiments described herein, one or more of VNFs 321-325 may be implemented as a virtualized OFCS. FIG. 4 illustrates a virtualized offline charging architecture 400 in an exemplary embodiment. The architecture 400 (also referred to as a "charging system") includes a pool 440 of virtualized Charging Collection Functions (vCCFs) 401-405. A vCCF is an offline charging element that creates and consolidates Charging Data Records (CDRs) for sessions set up over a network, such as an IP Multimedia Subsystem (IMS), Long Term Evolution (LTE), or another type of network. A vCCF as described herein may represent a 3GPP-compliant Charging Data Function (CDF)/Charging Gateway Function (CGF). The vCCFs 401-405 are each comprised of a plurality of virtual machines (VM). Each vCCF 401-405 may be implemented using the physical resources of a single host, or may preferably be implemented using physical resources distributed among multiple hosts.

In this embodiment, vCCF 401 includes an active pilot (or administrator) VM 410, a standby pilot VM 411, an active I/O VM 412, a standby I/O VM 413, and a plurality of Charging Function (CF) VMs 414 (also referred to as application VMs). The CF VMs 414 implement charging functions for offline charging, which includes handling/processing of accounting requests, such as Diameter ACRs. For example, each CF VM 414 may provide an instance of a CDF and CGF that processes accounting requests (e.g., ACR) and generates CDRs. The other vCCFs 402-404 may include a similar virtual structure as vCCF 401. The vCCF 405 is shown without CF VMs 414, which is explained below.

Architecture 400 may also include a front-end distributor 418 and a software (SW) upgrade manager 420 coupled to each of the vCCFs 401-405. Distributor 418 comprises an apparatus, a server, a device, a VM, an application, or equipment that is configured to distribute accounting requests (e.g., Diameter ACRs) among the vCCFs. Distributor 418 may comprise a Diameter Routing Agent (DRA) as suggested by the 3GPP. SW upgrade manager 420 comprises an apparatus, a server, a device, or equipment (including hardware) that is configured to implement a software upgrade in vCCFs 401-405. Among its duties, SW upgrade manager 420 may identify a software upgrade (e.g., a new version or new release of software), and control the software upgrade as described in more detail below. SW upgrade manager 420 may also be an operator console. SW upgrade manager 420 may be implemented as part of management and orchestration 330 as illustrated in FIG. 3.

Figure 5:
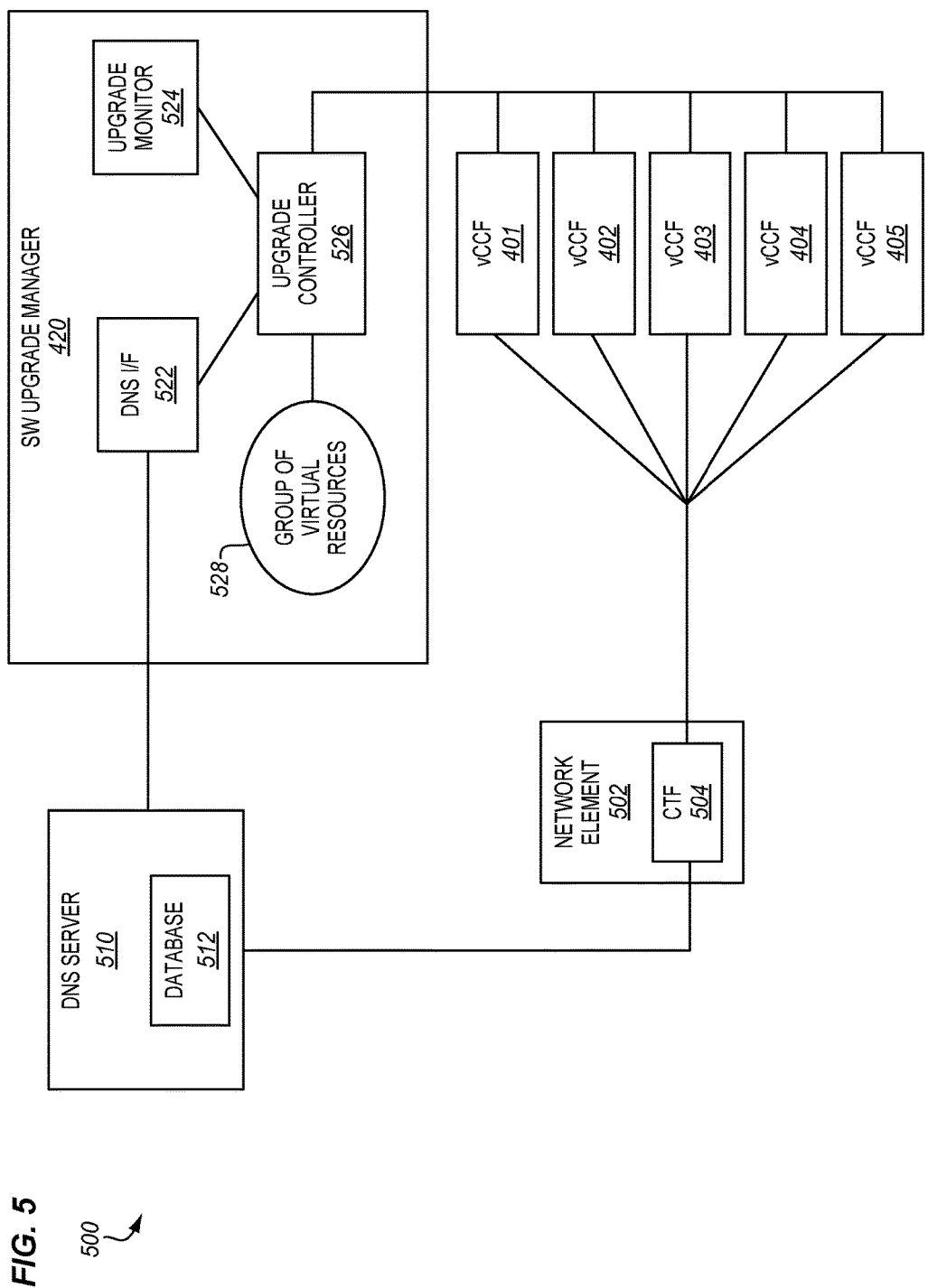
FIG. 5 illustrates a network that uses a virtualized OFCS in an exemplary embodiment.

FIG. 5 illustrates a network 500 that uses a virtualized OFCS in an exemplary embodiment. The virtualized OFCS in network 500 is represented by vCCFs 401-405 that provide offline charging duties for network 500. Network 500 includes network element 502 that performs services for sessions in network 500. Examples of network element 502 include an application server or S-CSCF of an IMS network, a gateway of an LTE network (e.g., P-GW or S-GW), etc. Network element 502 includes a CTF 504 that is configured to collect information pertaining to chargeable events, assemble this information into matching charging events, and send the charging events to a vCCF 401-405. The charging events may be provided by CTF 504 in an accounting request, such as a Diameter Accounting Request (ACR). Although only one network element 502 and CTF 504 is shown in FIG. 5, those of ordinary skill in the art understand that network 500 includes multiple network elements and multiple CTFs.

The vCCFs 401-404 are each configured to receive the accounting requests from CTF 504, and use the information included in the accounting requests to construct CDRs. A CDR is a formatted collection of information about a chargeable event (e.g., time of call or session set-up, time of call or session tear-down, amount of data transferred, etc.) for use in billing and accounting. The vCCFs 401-404 may correlate the CDRs for sessions, write the CDRs into a CDR file, and make the CDR file available to the billing domain.

The vCCF 405 is provisioned as a skeletal vCCF. A skeletal vCCF is a framework of an operational vCCF, but does not have load-bearing capabilities. The skeletal vCCF may have basic I/O capabilities and may be provisioned with parameters to communicate with a CTF. For example, a skeletal vCCF may be able to communicate with a CTF using Device-Watchdog-Request/Device-Watchdog-Answer (DWR/DWA), Capabilities-Exchange-Request/Capabilities-Exchange-Answer (CER/CEA), or similar commands. But, the skeletal vCCF is not enabled to process or handle Accounting Request (ACR) commands from a CTF. As illustrated in FIG. 4, skeletal vCCF 405 may include pilot (active/standby) VMs, and I/O (active/standby) VMs. But unlike vCCFs 401-404, skeletal vCCF 405 does not include functional CF VMs that process or handle ACRs from a CTF. Skeletal vCCF 405 may be devoid of CF VMs, or may have CF VM resources that are not enabled for operation. Therefore, a skeletal vCCF 405 is considered "deactivated" as an operational vCCF in pool 440.

Network 500 also includes one or more Domain Name System (DNS) servers 510. DNS server 510 maintains a directory of domain names, and translates the domain names into Internet Protocol (IP) addresses. DNS server 510 therefore stores a domain name and an associated IP address for each of vCCFs 401-405 in a database 512. FIG. 6 illustrates database 512 of DNS server 510 in an exemplary embodiment. Among the DNS information stored in DNS server 510, database 512 stores DNS Resource Records (RR) 600 for each of vCCFs 401-405. DNS RRs specify the location of a server(s) for a specific protocol and domain. DNS RRs 600 include the domain, priority, weight field, and a domain name of a target vCCF. Generally, the priority and weight field of DNS RRs indicate, to CTFs, the capability of vCCFs for handling accounting sessions. The priority of a vCCF specifies how a CTF would select among vCCFs 401-405 for new accounting sessions, and the weight field specifies a relative weight for entries with the same priority. The fields represented in DNS RRs 600 as shown in FIG. 6 are just an example, and DNS RRs 600 may include different or additional fields as desired.

In FIG. 5, network 500 also includes SW upgrade manager 420. SW upgrade manager 420 includes a DNS interface device 522, an upgrade monitor 524, and an upgrade controller 526. DNS interface device 522 comprises any device or hardware component that is configured to communicate with DNS server 510. DNS interface device 522 is able to provision data within database 512 of DNS server 510, and/or modify data within database 512 of DNS server 510. Upgrade monitor 524 comprises any device or hardware component that is configured to identify a software upgrade for a vCCF, such as a new version or new release of software executable within a vCCF. Upgrade controller 526 comprises any device or hardware component that is configured to initiate and/or manage an upgrade process to install a software upgrade in a vCCF. As part of managing an upgrade process, upgrade controller 526 is capable of accessing a group 528 of virtual resources, to create new VMs for use in a VNF from the group 528, to dismantle VMs from a VNF and return the virtual resources to the group 528, etc. DNS interface device 522, upgrade monitor 524, and upgrade controller 526, or other systems of SW upgrade manager 420 may be implemented on a shared or distributed platform of hardware resources, which may include one or more processors, memory, etc.

Figure 7:
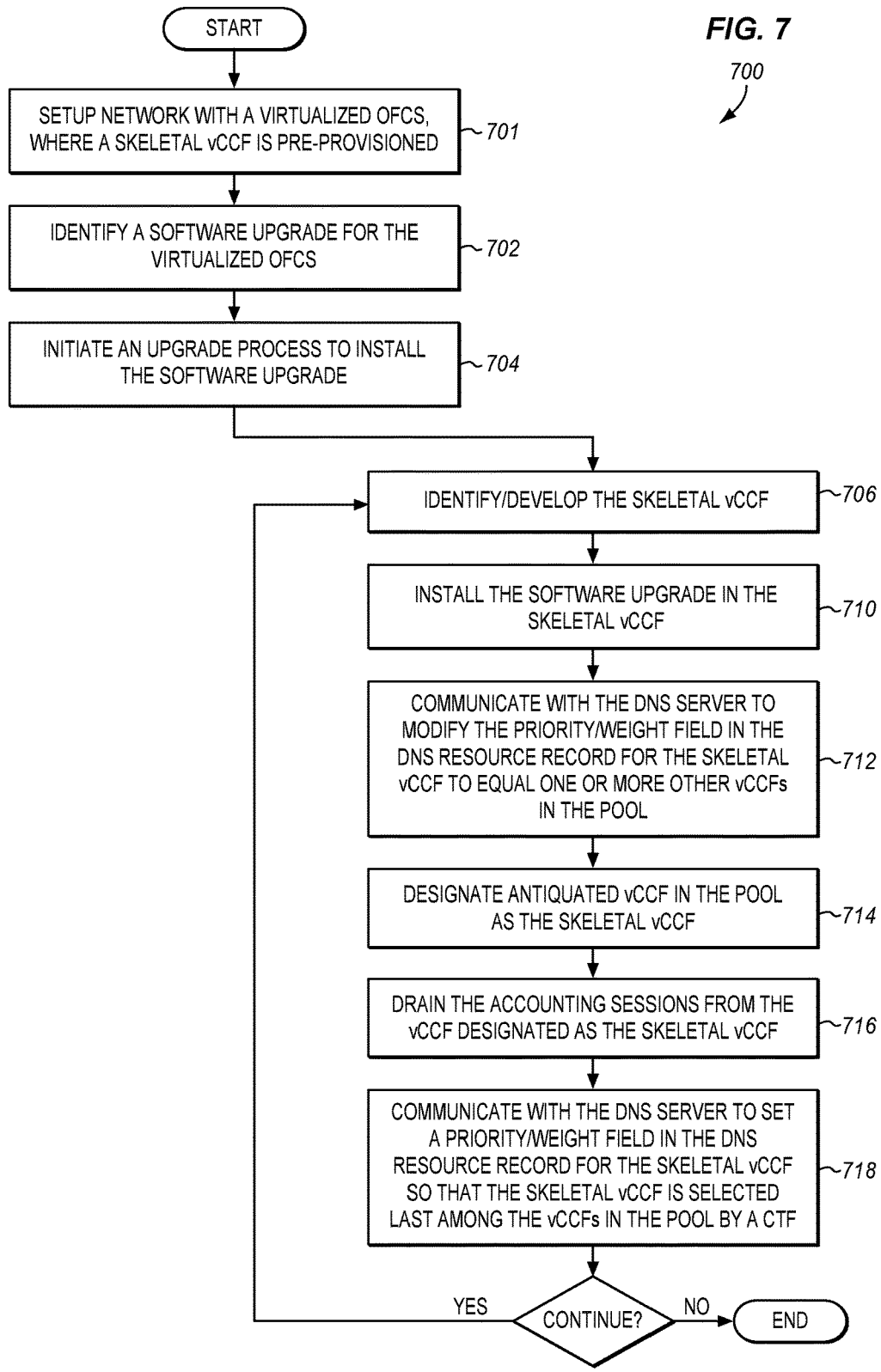
FIG. 7 is a flow chart illustrating a method of performing a software upgrade in an exemplary embodiment.

FIG. 7 is a flow chart illustrating a method 700 of performing a software upgrade in an exemplary embodiment. The steps of method 700 will be described with reference to network 500 in FIG. 5, but those skilled in the art will appreciate that method 700 may be performed in other networks or architectures. Also, the steps of the flow charts described herein are not all inclusive and may include other steps not shown, and the steps may be performed in an alternative order.

SW upgrade manager 420 may first manage initial setup of network 500 that includes the virtualized OFCS (step 701). The OFCS includes pool 440 of vCCFs that are pre-provisioned in network 500. As part of initial setup, a sub-network is created to allocate IP addresses from a pre-defined range in the sub-network to vCCFs. Also, the vCCFS 401-405 are provisioned in the network. To provision the vCCFS 401-405, the vCCFS 401-405 are programmed to communicate with CTFs 504 in network 500, and vice-versa. Also, DNS configuration is performed in DNS server 510. As part of DNS configuration, DNS interface device 522 may set a priority and weight field in the DNS RRs for the vCCFs 401-405. More particularly, DNS interface device 522 may set a priority and weight field in the DNS RRs for the skeletal vCCF so that the skeletal vCCF is selected last among the vCCFs 401-405. For example, if a CTF is configured to contact a vCCF with the lowest-numbered priority, then DNS interface device 522 may set the priority of the skeletal vCCF to be the highest-numbered priority among the vCCFs 401-405. Also, DNS interface device 522 may set the weight field of the skeletal vCCF to a value of "1". With highest-numbered priority among the vCCFs and a weight field set to a value of "1", a CTF would only select the skeletal vCCF when no other vCCFs remains in-service to handle an accounting session (i.e., all vCCFs go out-of-service (OOS)).

With the network setup, there may be a point in time where the vCCFs (i.e., vCCFs 401-405) are subject to an upgrade or update. Upgrade monitor 524 identifies a software upgrade for the virtualized OFCS (step 702), which includes vCCFs 401-405 in this embodiment. Upgrade monitor 524 may identify a particular service pack, new release, new version, etc., of the software desired for vCCFs 401-405. Upgrade controller 526 then initiates the upgrade process to install the software upgrade (step 704).

For the upgrade process, upgrade controller 526 identifies, develops, or enhances the skeletal vCCF in pool 440 (step 706). The skeletal vCCF is pre-provisioned in network 500, and may have the appropriate resources (VMs) to be an operational vCCF (i.e., capable of processing ACRs). When the skeletal vCCF has the appropriate resources, upgrade controller 526 may only need to identify which vCCF is designated as the skeletal vCCF. In another embodiment, although the skeletal vCCF is pre-provisioned in network 500, upgrade controller 526 may initiate a growth procedure to allocate more resources and VMs appropriately so that the skeletal vCCF possesses sufficient processing capacity. If the skeletal vCCF initially includes only pilot VMs and I/O VMs, then upgrade controller 526 may add CF VMs 414 to the skeletal vCCF that are enabled for processing Diameter ACRs. The skeletal vCCF would then have load bearing capabilities (i.e., process ACRs). If the skeletal vCCF already includes CF VMs that were disabled, then upgrade controller 526 may enable the CF VMs in the skeletal vCCF. Upgrade controller 526 may also apply any site-specific parameters to the skeletal vCCF, and the configuration data from any of the other live vCCFs may be exported to the skeletal vCCF. Subsequently, a network operator may perform a health check on the skeletal vCCF to verify that it is ready to be put into service.

Assume for this embodiment that upgrade controller 526 identifies or develops vCCF 405 as the skeletal vCCF. Upgrade controller 526 then installs the software upgrade in skeletal vCCF 405 (step 710). Skeletal vCCF 405 therefore includes the latest version or release of the software. Upgrade controller 526 then contacts DNS server 510 to indicate that skeletal vCCF 405 is ready to handle new accounting sessions from CTFs. To do so, DNS interface device 522 communicates with DNS server 510 to modify the priority in the DNS RR for skeletal vCCF 405 to equal one or more of the other vCCFs 401-404 in pool 440 (step 712). DNS interface device 522 may also increase the weight field in the DNS RR for skeletal vCCF 405. If a CTF were to query DNS server 510 for an accounting session, then the priority and weight field of the DNS RR for skeletal vCCF 405 would indicate to the CTF that skeletal vCCF 405 is selectable for accounting sessions. Skeletal vCCF 405 may therefore handle traffic proportionate to its weight field.

Upgrade controller 526 designates another one of the vCCFs 401-404 in the pool 440 as the skeletal vCCF for the next iteration of the upgrade process, such as vCCF 401 (step 714). The vCCFs 401-404 in pool 440 that are executing an old version of software are referred to herein as an "antiquated vCCF". Upgrade controller 526 may therefore select one of the antiquated vCCFs to use as the skeletal vCCF for the next iteration of the upgrade process. Upgrade controller 526 drains the accounting sessions being handled by (next) skeletal vCCF 401 (step 716). To do so, upgrade controller 526 may communicate with skeletal vCCF 401 and/or the distributor unit so that skeletal vCCF 401 does not accept new accounting sessions. For example, if skeletal vCCF 401 receives an ACR[Start], then skeletal vCCF 401 will reject the ACR[Start]. Eventually, skeletal vCCF 401 will process each of the accounting sessions that it is currently handling to completion. At this point, skeletal vCCF 401 will be drained of accounting sessions. Upgrade controller 526 may also remove CF VMs that are enabled for processing Diameter ACRs from skeletal vCCF 401. Skeletal vCCF 401 will include pilot VMs, I/O VMs, and CF VMs. When vCCF 401 is designated as a skeletal vCCF, upgrade controller 526 may dismantle vCCF 401 to remove the CF VMs and return these VM resources to the group 528 of virtual resources (see FIG. 5), or may disable the CF VMs.

DNS interface device 522 then communicates with DNS server 510 to set a priority in the DNS RR for the (next) skeletal vCCF 401 so that skeletal vCCF 401 is selected last among vCCFs 401-405 of the pool 440 by a CTF (step 718). DNS interface device 522 may also set a weight field in the DNS RR for skeletal vCCF 401 so that skeletal vCCF 401 is selected last among vCCFs 401-405 of the pool 440 by a CTF. The new skeletal vCCF 401 is essentially taken out of service by how DNS interface device 522 sets the priority/weight field in DNS server 510. Therefore, skeletal vCCF 401 is now available for a software upgrade.

A determination is then made as to whether the upgrade process should continue. If the software upgrade has been installed in each of vCCFs 401-405 as desired, then the upgrade process ends. If antiquated vCCFs remain in pool 440, then the upgrade process repeats (back to step 706). When there are multiple vCCFs needing the software upgrade, the upgrade process goes through multiple iterations until each of the operational vCCFs in pool 440 includes the latest version of the software. The last vCCF in pool 440, which is designated as a skeletal vCCF, remains a skeletal vCCF until the upgrade process is used again for a newer update or release. Because a skeletal vCCF is used in the upgrade process as described above, the capacity of the system is minimally reduced while the new version of the software is being installed. Thus, there is no interruption in service while the software upgrade is being installed, and the network operator should not be at risk of losing revenue. Also, each vCCF in pool 440 is already provisioned in network 500 for DNS and for communicating with CTFs in network 500. Therefore, when a software upgrade is installed and the skeletal vCCF is activated in the network, little or no operator intervention is needed for the newly-activated skeletal vCCF to be discovered and selected by CTFs.

Figure 8:
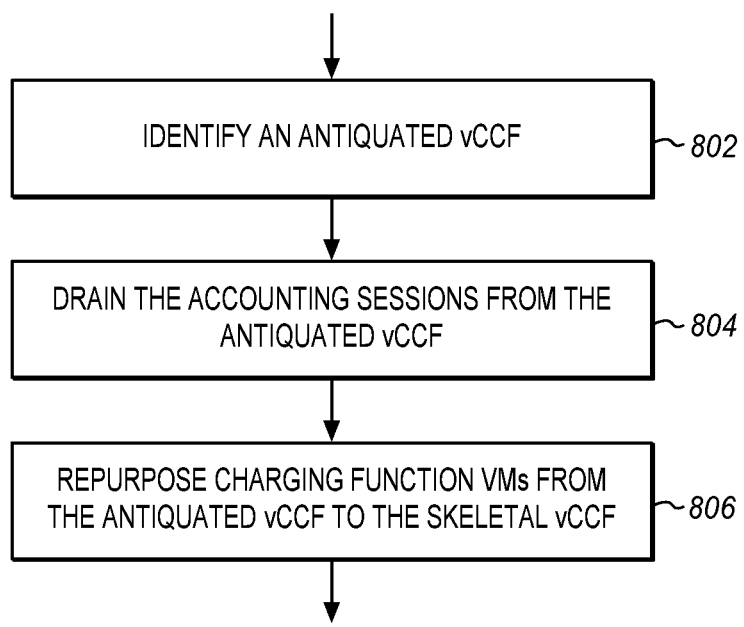
FIG. 8 illustrates further steps of the method of FIG. 7 in an exemplary embodiment.

If resources are abundant in the network, a separate skeletal vCCF may be setup in the network in addition to the operational vCCFs for software upgrades. For example, when the skeletal vCCF is initially provisioned, it may include pilot VMs, I/O VMs, and CF VMs. Therefore, upgrade controller 526 may not need to add any CF VMs when identifying/developing in the skeletal vCCF (step 706 of method 700). If resources are not as abundant in the network, resources from the operational vCCFs may be repurposed for the skeletal vCCF. In other words, one vCCF is de-grown while the skeletal vCCF is grown so that the resources are reused. When an operational vCCF is re-purposed as a skeletal vCCF, method 700 may include additional steps. FIG. 8 illustrates additional steps of method 700 in an exemplary embodiment. Method steps 802-806 may be performed in parallel with step 706 in FIG. 7. Upgrade controller 526 identifies an antiquated vCCF (step 802), such as vCCF 401. At this time, skeletal vCCF 405 includes pilot VMs and I/O VMs, but does not include CF VMs. Antiquated vCCF 401 includes pilot VMs, I/O VMs, and CF VMs. Upgrade controller 526 drains the accounting sessions being handled by antiquated vCCF 401 (step 804). Upgrade controller 526 then repurposes the CF VMs that are enabled for processing Diameter ACRs from antiquated vCCF 401 to the skeletal vCCF (step 806). As CF VMs are being torn down from antiquated vCCF 401, these CF VMs are built into skeletal vCCF 405. Thus, skeletal vCCF 405 is grown as antiquated vCCF 401 is de-grown.

The antiquated vCCF 401 that is torn down may be designated as the next skeletal vCCF in step 714 of method 700 (see FIG. 7). Because accounting sessions have already been drained from antiquated vCCF 401 (see step 804), step 716 of method 700 may be skipped.

Example

For this example, vCCFs 401-404 (see FIG. 4) are considered to be on release N, with the objective to move vCCFs 401-404 to the release N+1. A vCCF typically is configured with the following components, each identified via its VM: (1) a pair of active/standby pilots controlling a switchable Cinder volume that stores the CDRs, (2) a pair of active/standby I/Os exposing the Diameter reference point support using TCP/IP or SCTP over which Diameter protocol is run, (3) N+k CCF execution logic implementing the CDF and CGF, and (4) a database (DB) as a service (DBaaS) comprising a pair of active/standby OAM endpoints, a pair of active/standby DB proxies, and an odd number of DB nodes that host the data with appropriate replication for data resilience.

From the network perspective, the most laborious part is setting up the Rf connectivity between a multitude of pre-existing network elements (NE) that report any chargeable events to a vCCF. This connectivity is established between individual NEs that have an integrated CTF and the active I/O exposed by the vCCF. It is typical to use a floating IP address (a "VIP" address) between the I/O instances and advertise this as the touchpoint to the NE/CTFs. A failover between the I/O instances still uses the same VIP address and is more or less seamless to the NE/CTFs.

To simplify the description, a single vCCF system is assumed to be upgraded at a time. Typical deployments use more than 1 vCCF instance for reliability, load-sharing, and flexibility. Assuming that multiple instances of a vCCF are in existence, the upgrade process would be shown to upgrade a single vCCF at a time, but with proper sparing, parallelism can be supported as well.

This example is described in the following broad steps:

Step 1: Creation of a sub-network from which IP addresses for the I/O VMs would be allocated;

Step 2: Initial DNS configuration;

Step 3: Converting a skeletal vCCF to release N+1; and

Step 4: Post-instantiation DNS modification.

As the first step, the network operator creates a sub-network with the intent to allocate IP addresses from a pre-defined range in the sub-network to the VIP addresses. From the command line interface (CLI), the following commands may be executed:

1a—Define a floating IP address pool via the CLI:
neutron net-create IO-Addresses--router: external=True
This creates a new network:

| Field | Value |
|---|---|
| admin_state_up | True |
| id | 5b54c3eb-bb0e-7d50-777d-1a2345678aff |
| name | IO-Addresses |
| ... | |
| router:external | True |
| ... | |
| tenant_id | 6b406408dff14a2ebf6d2cd7418510b2 |

1b—Create a pool of floating IP addresses (this example uses 5 addresses) within the network:

```
$ neutron subnet-create IO-Addresses--allocation-pool
    start=10.20.30.40,        end=10.20.30.44--gateway
    10.20.30.254--disable-dhcp ext-net 10.20.30.0/24
This creates a new subnet:
```

| Field | Value |
|---|---|
| allocation_pools | {"start": "10.20.30.40", "end": "10.20:30.44"} |
| cidr | 10.20.30.0/24 |
| ... | |
| gateway_ip | 10.20.30.254 |
| ... | |
| tenant_id | e5be83dc0a474eeb92ad2cda4a5b94d5 |

This creates a pool of 5 floating IP addresses.

1c—Allocate IP addresses from this range when vCCFs are being instantiated. This is addressed via the template files (Heat Orchestration Template file and Environment file) when the vCCF stack is being created by associating the IP address from the pool of IP addresses created.

As the second step, DNS configuration is performed. DNS queries are used by a CTF for name resolution. For example, a Fully Qualified Domain Name (FQDN), such as "IO.ccf.cust.com", would need to resolve to the list of IP addresses allocated to the vCCF I/Os, assuming all I/O addresses are occupied and in use. Normally, a CTF expects to get a response that lists 10.20.30.40, 10.20.30.41, 10.20.30.42, 10.20.30.43 and 10.20.30.44 as the resolution to the query, if these records are provisioned in the DNS as A-records:
  DNS Query:
  Header: QR=0, OPCODE=0, QTYPE=A, RD=1
  Question: QNAME=IO.ccf.cust.com
The /etc/resolv.conf on the host would point to itself and the /etc/named.conf identifies forwarders as the service provider's DNS IP addresses. Here, QR=0 implies query, OPCODE=0 implies standard query, QTYPE=A implies A-records are desired, and RD=1 implies redirection desired.
  DNS Response:
  Header: QR=1, OPCODE=0, AA Question: QNAME=IO.ccf.cust.com
  Answer: 10.20.30.40, 10.20.30.41, 10.20.30.42, 10.20.30.43, 10.20.30.44
  TTL=3600

QR=1 implies response, OPCODE=0 implies standard query, and AA implies authoritative answer.

For the skeletal vCCF to be put at a low priority in its inactive state, the A-records do not suffice, and the query type should not be for A-records. Instead, the NE/CTFs (clients) use SRV (service) queries that account for weights associated with different hosts in the response to the query:
  QNAME=_service._protocol.target, QCLASS=IN, QTYPE=SRV.

The SRV Resource Records (RR) may be as indicated in Table 1:

TABLE 1

| _service._proto.name | TTL | class | priority | weight | port | target |
|---|---|---|---|---|---|---|
| _diameter._tcp.ccf | 30 | IN | SRV 10 | 25 | 3868 | vCCF1.customer.com |
| _diameter._tcp.ccf | 30 | IN | SRV 10 | 25 | 3868 | vCCF2.customer.com |
| _diameter._tcp.ccf | 30 | IN | SRV 10 | 25 | 3868 | vCCF3.customer.com |
| _diameter._tcp.ccf | 30 | IN | SRV 10 | 25 | 3868 | vCCF4.customer.com |
| _diameter._tcp.ccf | 30 | IN | SRV 20 | 1 | 3868 | vCCF5.customer.com |

SRV RRs are further described in IETF RFC 2782, which is incorporated by reference as described herein. The first 4 entries in Table 1 correspond to the live vCCFs 401-404, and the fifth entry in Table 1 is for the skeletal vCCF (vCCF5). The "priority" of a target vCCF in the SRV RR specifies how a CTF would select among vCCFs 1-5 for new accounting sessions. A CTF must attempt to contact the target vCCF with the lowest-numbered priority it can reach. Target vCCFs with the same priority should be tried in an order defined by the weight field. The "weight field" specifies a relative weight for entries with the same priority. Larger weights should be given a proportionately higher probability of being selected, while lower weights should be given a proportionately lower probability of being selected. The range of this number is 0-65535. In the absence of a protocol whose specification calls for the use of other weighting information, a CTF arranges the SRV RRs of the same priority in the order in which target vCCFs will be contacted. The following algorithm should be used to order the SRV RRs of the same priority: (1) arrange all SRV RRs (that have not been ordered yet) in any order, except that all those with weight 0 are placed at the beginning of the list; (2) compute the sum of the weights of those RRs, and with each RR, associate the running sum in the selected order; (3) choose a uniform random number between 0 and the sum computed (inclusive); and (4) select the RR whose running sum value is the first in the selected order which is greater than or equal to the random number selected. The target vCCF specified in the selected SRV RR is the next one to be contacted by the CTF.

The "port" indicated in the SRV RRs is the port on the target vCCF. The range is 0-65535, but is uniformly "3868" for Diameter Rf protocol. The "target" indicated in the SRV RRs is the domain name of the target vCCF. There must be one or more address records for this name.

In this example, the priority of vCCFs 1-4 are set to "10", and the weight field is set to "25". Therefore, it is expected that 25% of new accounting sessions are directed to each of vCCFs 1-4. The priority of the skeletal vCCF (vCCF5) is set to "20", and the weight field is set to "1". The only time the skeletal vCCF (vCCF5) would be selected and contacted by a CTF is when no vCCF remains in-service with a higher priority (that is, all vCCF1-4 go OOS).

At this step in the method, there are five vCCFs with which all CTFs have established a handshake, but vCCF5 is not sent any traffic to handle by the CTFs. The purpose of this nuance is to pre-create the touchpoints associated with that vCCF, without subjecting it to handling any traffic.

As the third step, the software upgrade is performed on the skeletal vCCF to the target release. This software upgrade is "in-place" (which would retain the touch points), and finish with a stack-update. In case additional resources are to be grown into the skeletal vCCF, the normal growth procedure is followed. Then, to apply site-specific parameters to the skeletal vCCF, the configuration data from any of the live systems is exported to vCCF5. Subsequently, the network operator performs a health check on the system and verifies that vCCF5 is ready to be put into service.

As the fourth step, the priority and weight field of the skeletal vCCF (vCCF5) are modified in the DNS. In this example, the priority and weigh field of the skeletal vCCF and vCCF1 are flipped in the DNS. The new DNS entries may be as indicated in Table 2:

TABLE 2

| _service._proto.name | TTL | class | priority | weight | port | target |
|---|---|---|---|---|---|---|
| _diameter._tcp.ccf | 30 | IN | SRV 10 | 25 | 3868 | vCCF5.customer.com |
| _diameter._tcp.ccf | 30 | IN | SRV 10 | 25 | 3868 | vCCF2.customer.com |
| _diameter._tcp.ccf | 30 | IN | SRV 10 | 25 | 3868 | vCCF3.customer.com |
| _diameter._tcp.ccf | 30 | IN | SRV 10 | 25 | 3868 | vCCF4.customer.com |
| _diameter._tcp.ccf | 30 | IN | SRV 20 | 1 | 3868 | vCCF1.customer.com |

As can be seen in Table 2, the priority and weight field for vCCF1 has been set to "20" and "1", respectively. The priority and weight field for vCCF5 has been set to "10" and "25", respectively. The DNS entries as in Table 2 have the effect that the established sessions to vCCF1 are handled to completion, while no new sessions are handed to it. At the same time, vCCF5 becomes a live system, handling traffic proportionate to its weight (equal to all other live systems). Because NE/CTFs had previously established a Diameter handshake with vCCF5, there is no need for the operator to initiate this communication.

The method described above allows for a seamless software upgrade without affecting live sessions in progress. Using pre-allocated IP addresses that are used during instantiation, the method also avoids requiring the NEs to establish a new handshake with the VNF. The latter is considered a provisioning activity that operators do not prefer. The method therefore does not require operator intervention for the NEs to establish connectivity via provisioning individual NEs to talk to the updated system.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:

1. A method comprising:
   setting up a network with a virtualized Offline Charging System (OFCS) that includes a pool of virtualized Charging Collection Functions (vCCFs), wherein the pool includes one of the vCCFs designated as a skeletal vCCF that is pre-provisioned to communicate with Charging Trigger Functions (CTFs) and pre-provisioned in a Domain Name System (DNS) server with a DNS resource record having a priority set so that the skeletal vCCF is selected last among the vCCFs in the pool by the CTFs for accounting sessions;
   identifying a software upgrade for the virtualized OFCS; and
   initiating an upgrade process to install the software upgrade, wherein the upgrade process includes the iterative steps of:
   developing the skeletal vCCF before installing the software upgrade;
   installing the software upgrade in the skeletal vCCF;
   communicating with the DNS server after the software upgrade to modify the priority in the DNS resource record for the skeletal vCCF to equal at least one of the other vCCFs in the pool;
   designating another one of the vCCFs in the pool as the skeletal vCCF for a next iteration of the upgrade process;
   draining the accounting sessions from the skeletal vCCF designated for the next iteration; and
   communicating with the DNS server to set a priority in the DNS resource record for the skeletal vCCF designated for the next iteration so that the skeletal vCCF is selected last among the vCCFs in the pool by the CTFs for accounting sessions.

2. The method of claim 1 wherein:
the skeletal vCCF, before developing, initially includes pilot Virtual Machines (VMs), and Input/Output (I/O) VMs that are configured to exchange Diameter messages with the CTFs; and
the VMs initially provisioned in the skeletal vCCF are unable to process Diameter Accounting Requests (ACRs).

3. The method of claim 2 wherein:
the step of developing the skeletal vCCF includes:
adding Charging Function (CF) VMs to the skeletal vCCF that are enabled for processing Diameter ACRs.

4. The method of claim 2 wherein:
the step of developing the skeletal vCCF includes:
repurposing Charging Function (CF) VMs from the other one of the vCCFs in the pool to the skeletal vCCF.

5. The method of claim 1 wherein communicating with the DNS server to set the priority in the DNS resource record for the skeletal vCCF designated for the next iteration so that the skeletal vCCF is selected last among the vCCFs in the pool comprises:
setting the priority in the DNS resource record for the skeletal vCCF designated for the next iteration to be the highest-numbered priority compared to other vCCFs in the pool.

6. The method of claim 1 wherein the upgrade process further includes:
communicating with the DNS server to set a weight field in the DNS resource record for the skeletal vCCF designated for the next iteration to a value of "1" so that the skeletal vCCF is selected last among the vCCFs in the pool by the CTFs.

7. The method of claim 1 wherein communicating with the DNS server after the software upgrade further includes:
communicating with the DNS server after the software upgrade to increase a weight field in the DNS resource record for the skeletal vCCF.

8. A system comprising:
a software upgrade manager that sets up a network with a virtualized Offline Charging System (OFCS) that includes a pool of virtualized Charging Collection Functions (vCCFs), wherein the pool includes one of the vCCFs designated as a skeletal vCCF that is pre-provisioned to communicate with Charging Trigger Functions (CTFs) and pre-provisioned in a Domain Name System (DNS) server with a DNS resource record having a priority set so that the skeletal vCCF is selected last among the vCCFs in the pool by the CTFs for accounting sessions;
the software upgrade manager includes:
DNS interface circuitry that communicates with the DNS server;
upgrade monitor circuitry that identifies a software upgrade for the virtualized OFCS; and
upgrade controller circuitry that initiates an upgrade process to install the software upgrade in an iterative fashion;
for the upgrade process:
the upgrade controller circuitry develops the skeletal vCCF before installing the software upgrade, and installs the software upgrade in the skeletal vCCF;
the DNS interface circuitry communicates with the DNS server after the software upgrade to modify the priority in the DNS resource record for the skeletal vCCF to equal at least one of the other vCCFs in the pool;
the upgrade controller circuitry designates another one of the vCCFs in the pool as the skeletal vCCF for a next iteration of the upgrade process, and drains the accounting sessions from the skeletal vCCF designated for the next iteration; and
the DNS interface circuitry communicates with the DNS server to set a priority in the DNS resource record for the skeletal vCCF designated for the next iteration so that the skeletal vCCF is selected last among the vCCFs in the pool by the CTFs for accounting sessions.

9. The system of claim 8 wherein:
the skeletal vCCF, before being developed by the upgrade controller circuitry, initially includes pilot Virtual Machines (VMs), and Input/Output (I/O) VMs that are configured to exchange Diameter messages with the CTFs; and
the VMs initially provisioned in the skeletal vCCF are unable to process Diameter Accounting Requests (ACRs).

10. The system of claim 9 wherein:
the upgrade controller circuitry adds Charging Function (CF) VMs to the skeletal vCCF that are enabled for processing Diameter ACRs to develop the skeletal vCCF.

11. The system of claim 9 wherein, concurrently with developing the skeletal vCCF:
the upgrade controller circuitry repurposes Charging Function (CF) VMs from the other one of the vCCFs in the pool to the skeletal vCCF.

12. The system of claim 8 wherein:
the DNS interface circuitry sets the priority in the DNS resource record for the skeletal vCCF designated for the next iteration to be the highest-numbered priority compared to other vCCFs in the pool.

13. The system of claim 8 wherein:
the DNS interface circuitry communicates with the DNS server to set a weight field in the DNS resource record for the skeletal vCCF designated for the next iteration to a value of "1" so that the skeletal vCCF is selected last among the vCCFs in the pool by the CTFs.

14. The system of claim 8 wherein:
the DNS interface circuitry communicates with the DNS server after the software upgrade to increase a weight field in the DNS resource record for the skeletal vCCF.

15. A non-transitory computer readable medium embodying programmed instructions executed by a processor to implement an upgrade process for implementing a software upgrade, wherein the instructions direct the processor to:
set up a network with a virtualized Offline Charging System (OFCS) that includes a pool of virtualized Charging Collection Functions (vCCFs), wherein the pool includes one of the vCCFs designated as a skeletal vCCF that is pre-provisioned to communicate with Charging Trigger Functions (CTFs) and pre-provisioned in a Domain Name System (DNS) server with a DNS resource record having a priority set so that the skeletal vCCF is selected last among the vCCFs in the pool by the CTFs for accounting sessions;
identify a software upgrade for the virtualized OFCS; and
initiate the upgrade process to install the software upgrade, wherein the upgrade process includes the iterative steps of:

developing the skeletal vCCF before installing the software upgrade;

installing the software upgrade in the skeletal vCCF;

communicating with the DNS server after the software upgrade to modify the priority in the DNS resource record for the skeletal vCCF to equal at least one of the other vCCFs in the pool;

designating another one of the vCCFs in the pool as the skeletal vCCF for a next iteration of the upgrade process;

draining the accounting sessions from the skeletal vCCF designated for the next iteration; and communicating with the DNS server to set a priority in the DNS resource record for the skeletal vCCF designated for the next iteration so that the skeletal vCCF is selected last among the vCCFs in the pool by the CTFs for accounting sessions.

16. The computer readable medium of claim 15 wherein:

the skeletal vCCF, before developing, initially includes pilot Virtual Machines (VMs), and Input/Output (I/O) VMs that are configured to exchange Diameter messages with the CTFs; and the VMs initially provisioned in the skeletal vCCF are unable to process Diameter Accounting Requests (ACRs).

17. The computer readable medium of claim 15 wherein communicating with the DNS server to set the priority in the DNS resource record for the skeletal vCCF designated for the next iteration so that the skeletal vCCF is selected last among the vCCFs in the pool comprises:

setting the priority in the DNS resource record for the skeletal vCCF designated for the next iteration to be the highest-numbered priority compared to other vCCFs in the pool.

18. The computer readable medium of claim 15 wherein the upgrade process further includes:

communicating with the DNS server to set a weight field in the DNS resource record for the skeletal vCCF designated for the next iteration to a value of "1" so that the skeletal vCCF is selected last among the vCCFs in the pool by the CTFs.

19. The computer readable medium of claim 15 wherein communicating with the DNS server after the software upgrade further includes:

communicating with the DNS server after the software upgrade to increase a weight field in the DNS resource record for the skeletal vCCF.

* * * * *